Feb. 23, 1965  F. R. PREDIGER ET AL  3,170,329
TEMPERATURE MONITORING APPARATUS
Filed Oct. 2, 1961
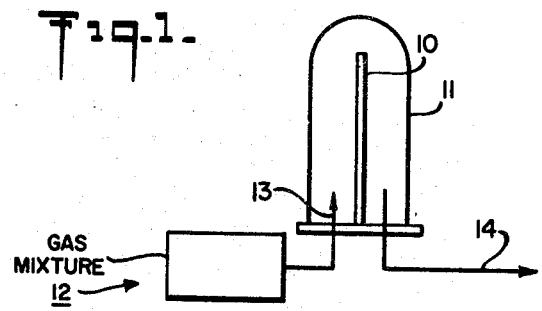
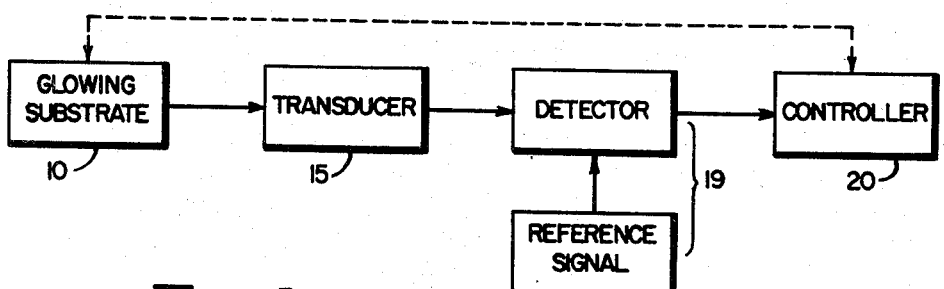
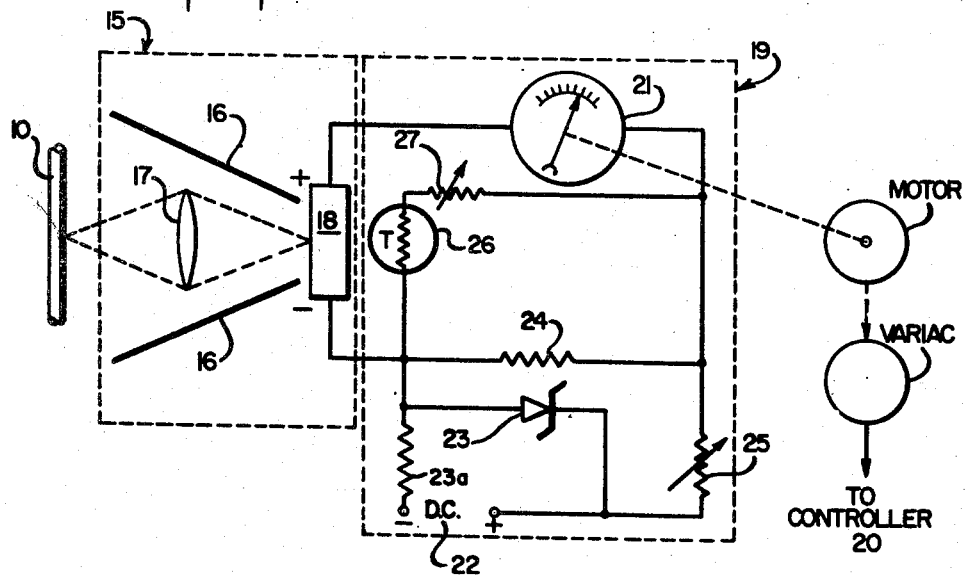
INVENTOR
FRED R. PREDIGER
MICHAEL KNIAZUK
BY
ATTORNEY

United States Patent Office 3,170,329
Patented Feb. 23, 1965

3,170,329
TEMPERATURE MONITORING APPARATUS
Fred Robert Prediger, Westfield, and Michael Kniazuk, Mountainside, N.J., assignors to Merck & Co., Inc., Rahway, N.J., a corporation of New Jersey
Filed Oct. 2, 1961, Ser. No. 142,362
1 Claim. (Cl. 73—355)

This invention relates to an automatic temperature controller and, more particularly, to a temperature monitoring device for a glowing substrate body.

In the process of growth from the vapor phase of, for example, semiconductor material, as is practiced in the art, a substrate body is generally heated to a temperature in the order of 1,000 to 1,200° C., giving rise to an incandescent glow in the material. Since the temperature of the body will affect the character of the growth, it is desired to provide an economical system to monitor and control the temperature of the body at a predetermined temperature within the aforementioned range.

In United States Patent No. 2,996,595, granted August 15, 1961 to applicants, there is described an apparatus for automatically controlling and regulating the temperature of an electrically heated silicon substrate body. As is described in detail therein, an electrical control circuit is provided to control the temperature of the body by taking advantage of changes in the physical properties of the silicon material as it changes in temperature. In the present invention a temperature monitoring apparatus is described which may be used in conjunction with the control device of the aforementioned patent to provide completely automatic temperature regulation.

The temperature monitoring apparatus of the present invention includes a solar cell transducer for converting radiant energy from the glowing body to an electrical output signal and a voltage detector circuit which is thermistor compensated for changes in the ambient temperature of the solar cell. In a preferred form a thermistor is matched to the temperature characteristics of a silicon solar cell transducer.

Accordingly, an object of the present invention is to provide an improved temperature monitoring apparatus for a glowing body.

It is a further object of the invention to provide an improved monitoring apparatus for automatically controlling the temperature of a substrate body heated at a high temperature.

Still another object of this invention is to provide an economical apparatus for transducing and detecting radiant energy from a heated substrate body using a temperature-compensated silicon solar cell.

Further objects and advantages will become apparent from the following description of the invention taken in conjunction with the figures, in which:

FIGURE 1 shows an apparatus for growing a body by vapor deposition;

FIGURE 2 is a block diagram in accordance with the instant invention; and

FIGURE 3 is a circuit diagram of the transducer and detector of FIGURE 2.

In accordance with the present invention there is provided a temperature control apparatus for a glowing body. While any electrically conducting material may be used as a glowing body in the apparatus described herein, including metals such as carbon and molybdenum, the invention will be described with particular reference to the use of a silicon semiconductor substrate as the glowing body.

Referring now to FIGURE 1, there is shown schematically an apparatus for growth of semiconductor material from the vapor phase which will illustrate the present invention in a preferred setting. Such an apparatus includes a rod-like silicon substrate 10 supported in a reaction chamber 11. In accordance with the present state of the art, a gas mixture 12, including a carrier gas, for example, hydrogen, and a decomposable silicon compound, such as silicochloroform, is introduced into chamber 11 via an inlet 13 and exhaust gasses removed through outlet 14. While in the chamber gas mixture 12 decomposes on the hot substrate 10 causing it to grow in diameter.

A temperature control apparatus for the glowing body is illustrated schematically in the block diagram of FIGURE 2. Such an apparatus includes a transducer 15, a detector and reference signal, indicated at 19, and a controller 20. Briefly, the transducer functions to convert the energy of glow of the body to an electrical output signal, which signal is opposed by a reference voltage to bring the signal within the range of a detector 19. The detected signal then is fed automatically into control apparatus 20 which, in turn, may be coupled back to the glowing body, if desired.

The present invention is primarily concerned with an apparatus for monitoring the temperature of the glowing silicon substrate, as shown in FIGURE 3. In FIGURE 3 there is shown a detailed circuit diagram of several of the blocks of FIGURE 2. Specifically the elements of the transducer 15 includes a radiant shield 16, a lens 17 and a solar cell 18. In the operating temperature range of 1150°–1200° C., a silicon solar cell is preferred since it delivers about 300 millivolts output at about 200 ohms impedance, which is an ample signal for detection without further amplification.

A typical silicon solar cell in accordance with the invention is a rectangle of dimensions ½ by 1 cm. mounted with the long side parallel to the silicon rod to be monitored and a 2½" diameter achromatic lens 17 mounted in a blackened cylinder housing with a 6" diameter aluminum disc heat reflector 16 in the front thereof which focuses a 1 to 1 image on the solar cell 18. The assembly is aligned with the head of the cell on the substrate target. The total distance between the substrate rod and the cell should be about 2 feet for a lens having a focal length of approximately 6 inches.

The detector portion of the temperature regulator of the present invention is generally referred to as 19 in FIGURE 3. In general the detector 19 includes a voltmeter 21 and a temperature-compensated reference voltage which opposes the output signal to bring the latter to within the range of the meter.

The reference voltage is developed by means of a D.C. supply voltage 22 and a Zener diode 23 across fixed resistor 24 and variable resistor 25 and is of a magnitude which is somewhat less than that generated by the silicon solar cell. The difference is an indication of the temperature of the body. The Zener diode has its usual current limiting resistor 23a.

In order to compensate for ambient temperature changes of the silicon solar cell caused by heat from the radiant substrate body or elsewhere, a thermistor 26 is provided in parallel circuit relationship with the reference voltage. The thermistor is physically mounted on the solar cell so as to respond in like manner to changes in ambient temperature. Assume an increase in ambient, the thermistor thereupon will show a decrease in resistance with the increase in ambient temperature. Therefore the resultant reference voltage which opposes the output of the solar cell, that is the combination of the reference voltage and the resistance of the thermistor in parallel, will also experience a lowering. The lowered reference voltage thus will match the lower output of the solar cell caused by a like increase in temperature. A particular thermistor in chosen to over match the temperature dependence of the silicon solar cell, with variable resistor 27 in series with thermistor being used to provide a fine control between the two elements. A 200-ohm, 5% per degree type thermistor is particularly advantageous in matching the temperature dependence of the silicon solar cell of approximately −0.5% per degree centigrade over a wide range of temperature conditions.

As further shown in FIGURE 3, the detected voltage may then be used to actuate a motor and variable resistor which can then, in turn, automatically energize a control apparatus connected to the glowing body to increase or reduce the temperature of the body as the case may be. Thus a fully automatic temperature control apparatus is provided starting with the glowing body and ending with a feedback loop from the controller.

While the invention has been described with particular reference to certain embodiments thereof, it will be understood that certain changes and modifications may be made which are within the skill of the art.

What is claimed is:

Apparatus for monitoring the temperature of a glowing silicon semiconductor body in the operating range of the glowing body above about 1100° C., comprising:
 (a) a silicon solar cell transducer converting the energy radiated by said body to electrical energy having an output voltage of the order of 300 millivolts for such operating temperature of the glowing body, with an internal impedance of the order of 200 ohms;
 (b) a source of D.C. reference voltage of a magnitude somewhat less than that generated by the silicon solar cell, said source comprising:
  (i) a D.C. supply voltage,
  (ii) a Zener diode fed from said D.C. supply voltage,
  (iii) a voltage dividing resistance network connected across said Zener diode, said reference voltage being the voltage across a portion of said voltage divider, and
  (iv) a thermistor, and a resistor in series therewith, connected in parallel with a portion of said voltage dividing resistance network, said thermistor being physically mounted on said solar cell so as to be affected by the same ambient temperature that affects said solar cell, and decreasing in resistance with an increase in ambient temperature, thereby modifying said reference voltage to reduce it when said ambient temperature of the solar cell and thermistor increases;
 (c) a D.C. voltmeter having a voltage range substantially less than 300 millivolts; and
 (d) means connecting the temperature-compensated reference voltage in opposition to the voltage of the output of the silicon solar cell through said voltmeter so that said voltmeter indicates the difference in such voltages, and thereby serves as an indication of the temperature of the glowing silicon semiconductor body in its operating range above about 1100° C.

References Cited by the Examiner
UNITED STATES PATENTS

| | | | |
|---|---|---|---|
| 2,116,450 | 5/38 | Richardson et al. | 236—15 |
| 2,187,613 | 1/40 | Nichols | 236—15 X |
| 2,302,554 | 11/42 | Kingsbury | 88—22.5 |
| 2,395,937 | 3/46 | Paalu | 88—22.5 |
| 3,045,125 | 7/62 | Mason | 250—238 |

OTHER REFERENCES

Athens: I.B.M. Technical Disclosure Bulletin, vol. 3, No. 10, March 1961, page 65.

Earhart: R.C.A. Technical Note No. 56, 1958.

EDWARD J. MICHAEL, *Primary Examiner.*

ALDEN D. STEWART, *Examiner.*